(12) United States Patent
Emby (10) Patent No.: US 10,372,192 B2
(45) Date of Patent: Aug. 6, 2019

(54) SYSTEM AND AN APPARATUS FOR CONTROLLING ELECTRIC POWER SUPPLY AND METHODS THEREFOR

(71) Applicant: TrickleStar Ltd, Causeway Bay (HK)

(72) Inventor: Bernard Christopher Emby, Kuala Lumpur (MY)

(73) Assignee: TrickleStar Ltd, Causeway Bay (HK)

( * ) Notice: Subject to any disclaimer, the term of this patent is extended or adjusted under 35 U.S.C. 154(b) by 38 days.

(21) Appl. No.: 15/357,311

(22) Filed: Nov. 21, 2016

(65) Prior Publication Data

US 2017/0147057 A1    May 25, 2017

Related U.S. Application Data

(60) Provisional application No. 62/258,796, filed on Nov. 23, 2015.

(51) Int. Cl.
| | |
|---|---|
| G06F 1/26 | (2006.01) |
| G06F 1/32 | (2019.01) |
| G06F 1/00 | (2006.01) |
| G06F 1/3231 | (2019.01) |
| G06F 1/3287 | (2019.01) |
| H01R 24/62 | (2011.01) |
| H01R 25/00 | (2006.01) |
| H01R 107/00 | (2006.01) |

(52) U.S. Cl.
CPC ............ G06F 1/3231 (2013.01); G06F 1/266 (2013.01); G06F 1/3287 (2013.01); H01R 24/62 (2013.01); H01R 25/003 (2013.01); H01R 2107/00 (2013.01); Y02D 10/171 (2018.01); Y02D 10/173 (2018.01)

(58) Field of Classification Search
CPC .................................................. G06F 1/3231
See application file for complete search history.

(56) References Cited

U.S. PATENT DOCUMENTS

| | | | |
|---|---|---|---|
| 4,675,537 A | 6/1987 | Mione |
| 4,901,007 A | 2/1990 | Sworm |
| 4,970,623 A | 11/1990 | Pintar |
| 5,424,903 A | 6/1995 | Schreiber |
| 5,430,598 A | 7/1995 | Rodolfo et al. |
| 5,455,487 A | 10/1995 | Mix et al. |

(Continued)

FOREIGN PATENT DOCUMENTS

| | | |
|---|---|---|
| AU | 2012100197 A4 | 3/2012 |
| AU | 2012100624 A4 | 6/2012 |

(Continued)

OTHER PUBLICATIONS

Dunn, "Smart" Power Strips: Helping to Stop Idle Current Now!, available at http://www.treehugger.com/gadgets/smart-power-strip-helping-to-stop-idle-current-now.html, 2005.

*Primary Examiner* — Mohammed H Rehman
(74) *Attorney, Agent, or Firm* — The Webb Law Firm (57) ABSTRACT

A system and an apparatus for controlling electric power supply and methods therefor are described. In particular, a system and an apparatus for powering down an electronic device and methods therefor include a device for communicating with a user, a processor for determining electric power supply to the device, and a sensor for monitoring presence of the user.

28 Claims, 4 Drawing Sheets

(56) References Cited

U.S. PATENT DOCUMENTS

| | | |
|---|---|---|
| 5,530,879 A | 6/1996 | Crump et al. |
| 5,598,042 A | 1/1997 | Mix et al. |
| 5,721,934 A | 2/1998 | Scheurich |
| 5,731,947 A | 3/1998 | Hirose |
| 5,780,775 A | 7/1998 | Yu |
| 5,899,761 A | 5/1999 | Crane et al. |
| 6,078,253 A | 6/2000 | Fowler |
| 6,282,655 B1* | 8/2001 | Given .................. G06F 1/3215 726/34 |
| 6,380,852 B1 | 4/2002 | Hartman et al. |
| 6,445,936 B1 | 9/2002 | Cannon et al. |
| 6,476,523 B1 | 11/2002 | Lee |
| 6,476,695 B1 | 11/2002 | Nakamichi |
| 6,509,655 B1 | 1/2003 | Wang |
| 6,586,849 B2 | 7/2003 | Tarr |
| 6,633,472 B2 | 10/2003 | Lai |
| 6,731,024 B1 | 5/2004 | Molnar et al. |
| 6,744,150 B2 | 6/2004 | Rendic |
| 7,132,763 B2 | 11/2006 | Rendic |
| 7,193,335 B2 | 3/2007 | Palmer et al. |
| 7,520,783 B2 | 4/2009 | Chou et al. |
| 7,622,822 B2 | 11/2009 | Gelonese |
| 7,795,759 B2 | 9/2010 | DuBose et al. |
| 7,795,760 B2 | 9/2010 | DuBose et al. |
| 7,843,081 B2 | 11/2010 | Lim |
| 7,944,086 B2 | 5/2011 | Hodges et al. |
| 7,964,989 B1 | 6/2011 | Puschnigg et al. |
| 7,977,825 B2 | 7/2011 | Gilbert |
| 8,093,751 B1 | 1/2012 | Puschnigg et al. |
| 8,110,942 B2 | 2/2012 | Ensinger |
| 8,219,154 B2 | 7/2012 | Wakamatsu |
| 8,669,716 B2 | 3/2014 | Recker et al. |
| 9,106,099 B2 | 8/2015 | Gelonese |
| 2002/0135474 A1 | 9/2002 | Sylliassen |
| 2003/0102717 A1 | 6/2003 | Tarr |
| 2005/0030680 A1 | 2/2005 | Lee et al. |
| 2005/0162282 A1 | 7/2005 | Dresti et al. |
| 2005/0270422 A1 | 12/2005 | Hsieh |
| 2005/0289378 A1 | 12/2005 | Vorenkamp et al. |
| 2006/0140452 A1* | 6/2006 | Raynor .................. G06F 1/3203 382/115 |
| 2007/0038334 A1 | 2/2007 | Chou et al. |
| 2007/0262646 A1 | 11/2007 | Lee |
| 2007/0297112 A1 | 12/2007 | Gilbert |
| 2008/0062333 A1 | 3/2008 | Iwahashi |
| 2008/0222431 A1 | 9/2008 | Paniagua et al. |
| 2009/0109015 A1* | 4/2009 | Ueno .................. G06F 21/316 340/500 |
| 2009/0119039 A1 | 5/2009 | Banister et al. |
| 2009/0177906 A1 | 7/2009 | Paniagua, Jr. et al. |
| 2009/0210178 A1 | 8/2009 | Bieganski |
| 2009/0210737 A1* | 8/2009 | Tajima .................. H04L 12/10 713/340 |
| 2009/0307505 A1 | 12/2009 | Robertson et al. |
| 2009/0320055 A1 | 12/2009 | Langille et al. |
| 2010/0031072 A1 | 2/2010 | Hung et al. |
| 2010/0079001 A1 | 4/2010 | Lee et al. |
| 2010/0295371 A1 | 11/2010 | Lee et al. |
| 2011/0043709 A1 | 2/2011 | Hirata et al. |
| 2013/0338844 A1 | 12/2013 | Chan et al. |
| 2014/0285019 A1 | 9/2014 | Gelonese |
| 2015/0137621 A1 | 5/2015 | Emby |
| 2016/0070324 A1 | 3/2016 | Emby et al. |
| 2016/0147200 A1* | 5/2016 | Zhang ................ H04L 12/2816 700/275 |
| 2016/0190748 A1 | 6/2016 | Emby |
| 2016/0327302 A1* | 11/2016 | Ribbich .................. F24F 11/30 |
| 2016/0357316 A1* | 12/2016 | Koizumi ............... G06F 1/1626 |

FOREIGN PATENT DOCUMENTS

| | | |
|---|---|---|
| DE | 19816560 A1 | 10/1999 |
| DE | 202005012443 U1 | 10/2005 |
| EP | 1223752 A2 | 7/2002 |
| EP | 1653572 A1 | 5/2006 |
| EP | 1672466 A1 | 6/2006 |
| EP | 2045885 A2 | 4/2009 |
| EP | 2051379 A1 | 4/2009 |
| FR | 2728074 A1 | 6/1996 |
| GB | 2327819 A | 2/1999 |
| WO | 2006106310 A2 | 10/2006 |
| WO | 2008064410 A1 | 6/2008 |
| WO | 2009135250 A1 | 11/2009 |

* cited by examiner

SYSTEM AND AN APPARATUS FOR CONTROLLING ELECTRIC POWER SUPPLY AND METHODS THEREFOR

CROSS REFERENCE TO RELATED APPLICATIONS

This application claims the benefit of U.S. Provisional Patent Application No. 62/258,796, filed Nov. 23, 2015, the disclosure of which is incorporated by reference in its entirety.

BACKGROUND OF THE INVENTION

Field of the Invention

The present invention relates to a system and an apparatus for controlling electric power supply and methods therefor. More particularly, the present invention relates to a system and an apparatus for powering down an electronic device and methods therefor.

Description of Related Art

The technology for powering down electronic and electrical devices is available, and such technology is widely used for a variety of applications.

The purpose of powering down a device is ultimately for power saving. Power can be saved by powering down one or more devices or by causing one or more devices to enter a mode of reduced power consumption when it is clear that they have not been used for a predetermined period of time. Power can also be saved by powering down associated secondary devices when one or more primary devices have been shut down.

As for computing devices, more particularly a personal computer, the device more often than not, is equipped with applications for setting the computer in a power saving mode via the power options made available to the computer. A user is able to customize the power saving modes from the options made available, which include the setting for switching off the monitor or setting the computer into hibernation mode if no activity is detected within a predetermined period of time. There are also applications provided by independent service providers that allow for the computer to sleep or shutdown. These products however require software to be installed, and these software applications 'eavesdrop' mouse, keyboard, and central processing unit (CPU) activity and monitor for a lack of activity. In the event no activity is detected, the computer and its peripherals will be put into a sleep or shut down state by these software applications.

There are several applications disclosed in prior art for saving energy. US 2014/0285019A1 discloses an energy saving device that has an electrical inlet which connects to a general power outlet, and has at least one monitored electrical outlet connecting to a computing device, the energy saving device having at least one switched electrical outlet which connects to, and supplies electrical power to, at least one peripheral device, which in a preferred embodiment is a computer monitor. The energy saving device further includes a switch to control electrical connection of the inlet to the switched electrical outlet, and thus to control supply of electric power to the peripheral devices, of which the peripherals may include printers, speakers, and desk lamps.

However, US 2014/0285019A1 is directed towards a device comprising an electrical inlet, an electrical outlet, and a switched outlet, which has a complex configuration for saving energy. Moreover, this prior art relies on software implementation.

U.S. Pat. No. 6,282,655B1 discloses a computer interface utilizing a sensor for sensing that a user is in the immediate vicinity of the computer, wherein the interface consists of a motion sensor, computer software for enabling the computer security, a keyboard interface connected to the motion sensor, and a keyboard connected to the keyboard interface.

Likewise, U.S. Pat. No. 6,282,655B1 relies on software implementation.

US 2010/0031072A1 discloses a system for power management and safety protection and a method thereof, wherein the system and method are applicable to a computer device having a sensor, whereby the sensor detects position information of a user relative to the computer device so as to determine whether to enter a sleep mode or a recognition mode, or the sensor detects motion information of the user so as to return to an operating mode.

However, US 2010/0031072A1 is reliant on a sensor that is built with the computer, and that the power management setting for this prior art is only available for computers that are equipped with such sensor. The system of this prior art is therefore inflexible.

Having said of the above, it should be noted that software applications, and in-built sensors with rigid operation, introduces extra cost, requirements for skilled installers, security issues for network managers, and extended disruption to workplaces.

There is therefore a need for a power saving system and apparatus that are not reliant on software applications, and that the system and apparatus are applicable for a wide range of computing devices or electrical equipment configured with high level interface.

SUMMARY OF THE INVENTION

The present invention aims to provide a system, an apparatus, and methods for controlling electric power supply to a device, whereby superfluous software installation is not required, and that the system and apparatus are applicable for a wide range of devices.

It is an object of the present invention to provide a system for controlling electric power supply comprising a device for communicating with a user, a processor for determining electric power supply to the device, and a sensor for monitoring presence of the user.

It is another object of the present invention to provide a system for controlling electric power supply, wherein the processor is configured for transmitting the control signal to the device for powering down operation of the device in an event the sensor detects that the device is operating in the absence of the user.

It is yet an object of the present invention to provide a system for controlling electric power supply, wherein the processor further comprises a control module for controlling electric power supply to a power strip. The processor is further configured for transmitting the control signal to the device for powering down operation of the device in the event the sensor detects that the device is operating in the absence of the user.

It is yet another object of the present invention to provide an apparatus for controlling electric power supply comprising a processor for determining electric power supply to a device, wherein the processor is configured for processing and generating a control signal and transmitting the control signal to the device via a communication protocol. The apparatus comprises a sensor for monitoring presence of a user, wherein the sensor is configured for transmitting a sensing signal to the processor via an interface, and wherein the processor is configured for transmitting the control signal to the device for powering down operation of the device, by receiving and processing the sensing signal from the sensor, in the event the sensor detects that the device is operating in the absence of the user.

It is a further object of the present invention to provide a method of operation of the apparatus comprising the steps of: detecting presence of a user for a predetermined period, and transmitting a control signal to a device connected to the apparatus for powering down the device in the event the absence of the user is detected within the predetermined period, wherein the control signal is an artificial signal comprehensible by the device for powering down operation of the device.

It is yet a further object of the present invention to provide a method of operation of the apparatus connected to a power strip comprising the steps of: detecting presence of a user for a predetermined period, transmitting a control signal to a device connected to the apparatus for powering down the device in an event an absence of the user is detected within the predetermined period, and terminating power supply to at least an electrical outlet of the power strip, wherein the control signal is an artificial signal comprehensible by the device for powering down operation of the device.

The preferred embodiments of the present invention therefore contribute to a power saving system, apparatus, and methods that are not reliant on software applications, and that the system and apparatus are applicable for a wide range of computing devices or electrical equipment configured with high level interface.

DESCRIPTION OF THE INVENTION

Described below are preferred embodiments of the present invention with reference to the accompanying drawings. Each of the following preferred embodiments describes an example not limiting in any aspect.

Figure 1:
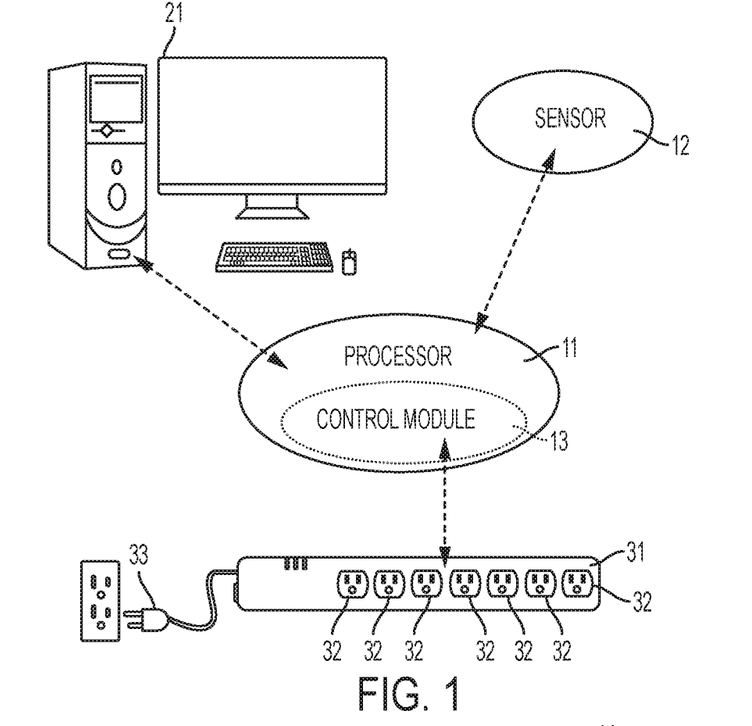
FIG. 1 illustrates a schematic representation of a system for controlling electric power supply according to a preferred embodiment of the present invention.

Referring to FIG. 1, the figure illustrates a schematic representation of a system for controlling electric power supply according to a preferred embodiment of the present invention. The system comprises fundamentally a device, a processor (11), and a sensor (12).

The device according to a preferred embodiment of the present invention is for communicating with a user, and the device is energized by electric power being supplied to the device from a main power supply. It is shown in FIG. 1 that the device is a personal computer (21). The personal computer (21) is connected to the processor (11) for determining electric power supply to the device, or in this case the personal computer (21), and the processor (11) is configured for processing and generating a control signal and transmitting the control signal to the device via a communication protocol. The processor (11) is connected to the sensor (12) for monitoring presence of the user, and the sensor is configured for transmitting a sensing signal to the processor (11) via an interface.

The processor (11) according to a preferred embodiment of the present invention is configured for transmitting the control signal to the device for powering down operation of the device, by receiving and processing the sensing signal from the sensor (12), in an event the sensor (12) detects that the device is operating in an absence of the user.

In another preferred embodiment of the present invention, the processor (11) further comprises a control module (13) for controlling electric power supply to a power strip (31). The control module (13) is shown in FIG. 1, residing within the processor (11), and the power strip (31) is shown in FIG. 1 comprising an electrical inlet (33) for receiving electric power supply and a plurality of electrical outlets (32), wherein each outlet (32) supplies electric power to an external device connected to the outlet (32). The control module (13) comprises electronic circuitry for controlling electric power supply to the power strip (31).

The processor (11) is connected to the power strip (31) via a low voltage control cable, preferably but not limited to a RJ11 cable, and the processor (11) transmits the control signal to the device via a communication protocol. The communication protocol is assisted by a universal serial bus (USB) connection to the device, which in this case is the personal computer (21). The USB connection is also configured for receiving electric power from the device.

The sensor (12) in a preferred embodiment of the present invention is an electronic sensor for detecting motion, preferably but not limited to, any one of an infrared sensor or a passive infrared sensor. It will be appreciated that the sensor (12) is preferably other than an electronic sensor, wherein the motion can be detected by: optical sensors such as, preferably but not limited to, a video and camera system; sound sensors such as microphones and acoustic sensors; magnetism such as, preferably but not limited to, magnetic sensors and magnetometer; radio frequency energy such as, preferably but not limited to, radar, microwave, and tomographic motion detection; or vibration sensors such as, preferably but not limited to, triboelectric, seismic, and inertia-switch sensors.

The device in a preferred embodiment of the present invention is an electronic device, as shown in FIG. 1, is a personal computer (21). However, it should be appreciated that the electronic device can be selected from a group of computing devices or electrical equipment configured with high level interface.

Figure 2:
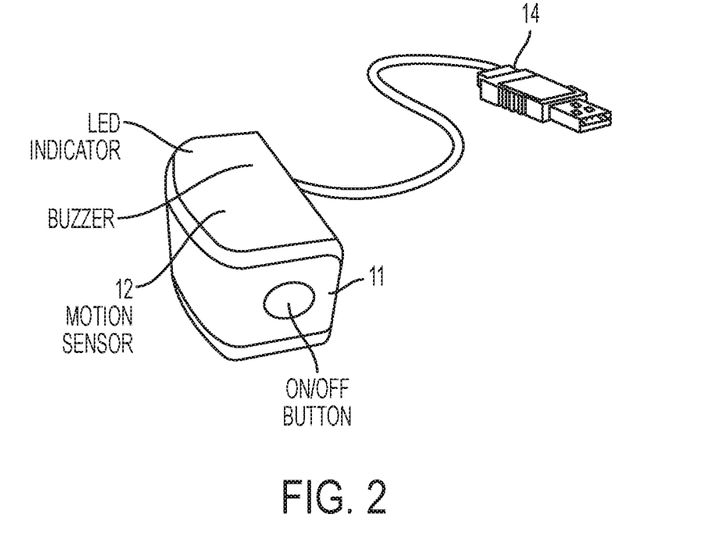
FIG. 2 illustrates a graphical representation of an apparatus for controlling electric power supply according to a preferred embodiment of the present invention.

Referring to FIGS. 1 and 2, FIG. 2 illustrates a graphical representation of an apparatus for controlling electric power supply according to a preferred embodiment of the present invention, comprising fundamentally the processor (11) and the sensor (12) as depicted in FIG. 1.

The processor (11) shown in FIG. 1, and as described in the foregoing description, is for determining electric power supply to a device. The processor (11) is configured for processing and generating a control signal and transmitting the control signal to the device via a communication protocol.

The processor (11) transmits the control signal to the device via a communication protocol, which is assisted by a universal serial bus (USB) connection (14) to the device, which in this case is the personal computer (21). The USB connection (14) is also configured for receiving electric power from the device. The processor (11) is connected to the sensor (12) for monitoring presence of the user with the sensor (12) being configured for transmitting a sensing signal to the processor (11) via an interface.

The processor (11) according to a preferred embodiment of the present invention is configured for transmitting the control signal to the device for powering down operation of the device, by receiving and processing the sensing signal from the sensor (12), in an event the sensor (12) detects that the device is operating in an absence of the user.

Figure 3:
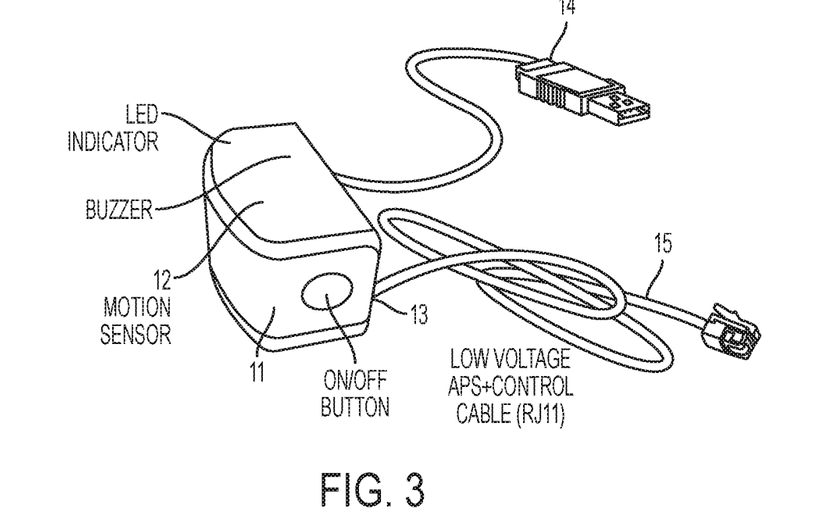
FIG. 3 illustrates a graphical representation of an apparatus for controlling electric power supply according to another preferred embodiment of the present invention.

Referring to FIGS. 1 and 3, FIG. 3 illustrates a graphical representation of an apparatus for controlling electric power supply according to another preferred embodiment of the present invention, comprising fundamentally the processor (11) and the sensor (12) as depicted in FIG. 1. In this preferred embodiment of the present invention, the processor (11) further comprises a control module (13) for controlling electric power supply to a power strip (31). The control module (13) is shown in FIG. 1 residing within the processor (11). The power strip (31) is shown in FIG. 1 comprising an electrical inlet (33) for receiving electric power supply and a plurality of electrical outlets (32), wherein each outlet (32) supplies electric power to an external device connected to the outlet (32).

The processor (11) is connected to the power strip (31), as shown in FIG. 1, via a low voltage control cable (15), preferably but not limited to, a RJ11 cable. The processor (11) transmits the control signal to the device via a communication protocol, which is assisted by a universal serial bus (USB) connection (14) to the device, which in this case is the personal computer (21). The USB connection (14) is also configured for receiving electric power from the device.

The sensor (12) in a preferred embodiment of the present invention is an electronic sensor for detecting motion, preferably but not limited to, any one of an infrared sensor or a passive infrared sensor. It will be appreciated that the sensor (12) is preferably other than an electronic sensor, wherein the motion can be detected by: optical sensors such as, preferably but not limited to, a video and camera system; sound sensors such as microphones and acoustic sensors; magnetism such as, preferably but not limited to, magnetic sensors and magnetometer; radio frequency energy such as, preferably but not limited to, radar, microwave, and tomographic motion detection; or vibration sensors such as, preferably but not limited to, triboelectric, seismic, and inertia-switch sensors.

The device in a preferred embodiment of the present invention is an electronic device, as shown in FIG. 1, is a personal computer (21). However, it should be appreciated that the electronic device can be selected from a group of computing devices or electrical equipment configured with high level interface.

In a preferred embodiment of the present invention, the apparatus further comprises any one or a combination of a visual indicator, audible indicator, and a switch, wherein the visual indicator is a light emitting diode for indicating operation of the apparatus, the audible indicator is a buzzer for alerting operation of the apparatus, and the switch is for controlling operational state of the apparatus.

Figure 4:
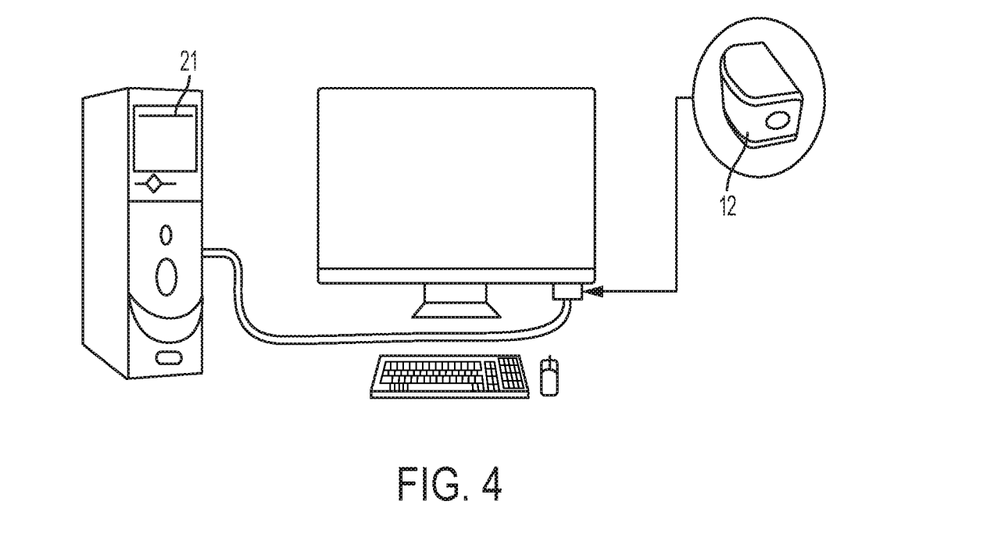
FIG. 4 illustrates a graphical representation of a setup for operation of the apparatus according to a preferred embodiment of the present invention.

Referring to FIG. 4, the figure illustrates a graphical representation of a setup for operation of the apparatus according to a preferred embodiment of the present invention.

As it is shown in FIG. 4, the apparatus according to a preferred embodiment of the present invention is mounted below a monitor of the personal computer (21). This preferred embodiment is a standalone configuration of the apparatus, of which the apparatus is powered by electric power supplied by the personal computer (21).

The method of operation of the apparatus in the preferred embodiment of the present invention in FIG. 4, comprises the steps of initially detecting presence of a user for a predetermined period and transmitting a control signal to a device connected to the apparatus for powering down the device in an event an absence of the user is detected within the predetermined period.

The control signal is an artificial signal comprehensible by the device for powering down operation of the device. In other words, the apparatus instructs the personal computer (21) to sleep/off via an artificial keystroke/mimicry of a keyboard connected to the personal computer (21). Ultimately, no software is required to perform this action.

Figure 5:
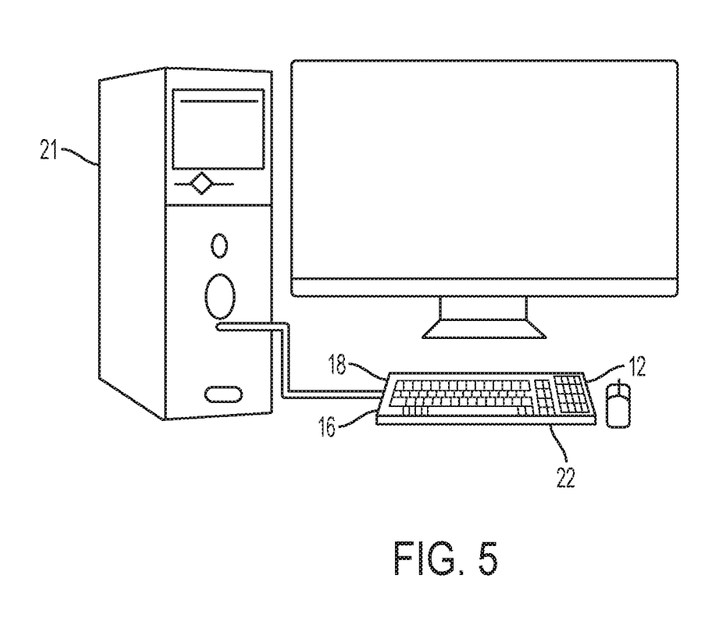
FIG. 5 illustrates a graphical representation of a setup for operation of the apparatus according to a preferred embodiment of the present invention.

Referring to FIG. 5, the figure illustrates a graphical representation of a setup for operation of the apparatus according to a preferred embodiment of the present invention.

The keyboard (22) in FIG. 5 is directly connected to the personal computer (21), and in this embodiment, the motion sensor (12) is incorporated with the keyboard (22).

The keyboard (22) comprises, preferably but not limited to, a motion sensor (12) for monitoring presence of a user within a subject, and characterized in that the keyboard (22) is connected to the personal computer (21) and transmits a sleep, hibernate, or shut down command to the personal computer (21) if no movement of a user is detected for a predetermined period within the subject area. The motion sensor (12) is preferably but not limited to a passive infrared sensor.

The connection between the keyboard (22) and the personal computer (21) is preferably but not limited to a wireless connection such as a Bluetooth connection, or a wired connection such as a Universal Serial Bus connection.

The keyboard (22) further comprises preferably a temperature sensor (16) for providing feedback to a building management system of a temperature status at a computer desk or at a keyboard area. In addition, the keyboard (22) may further comprise a light level sensor (18) for providing feedback to a building management system of a light level data at a computer desk or at a keyboard area.

The preferred embodiment of the keyboard (22) is preferably operated by a method comprising the steps of initially detecting movement of a user for a predetermined period, and subsequently instructing a computer to sleep, hibernate, or shut down in the event no presence of a user is detected for the predetermined period.

Figure 6:
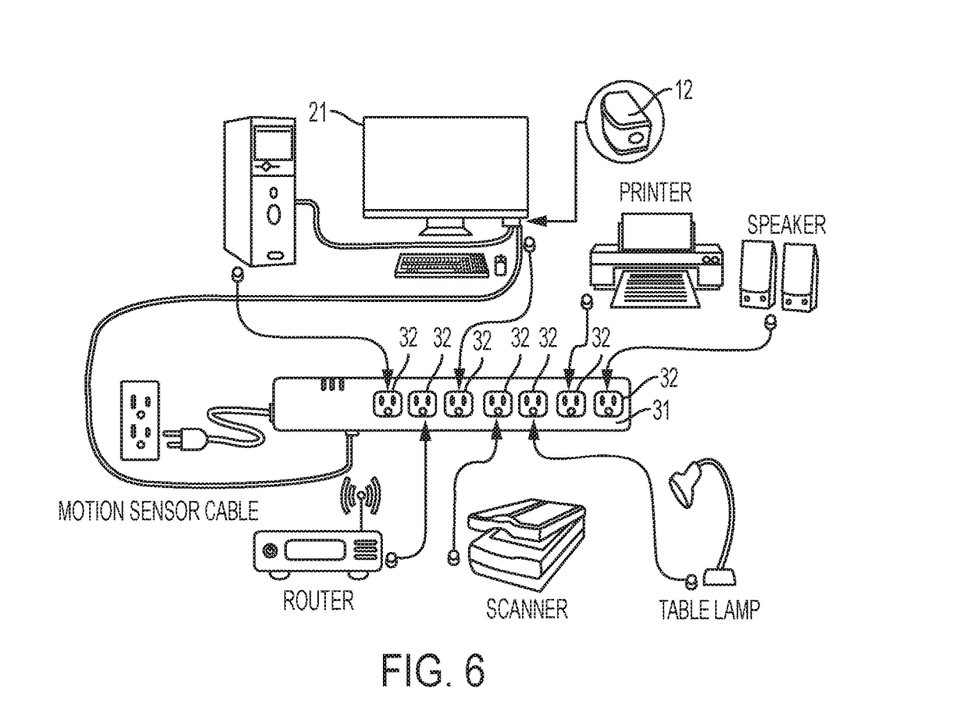
FIG. 6 illustrates a graphical representation of a setup for operation of the apparatus according to another preferred embodiment of the present invention.

Referring to FIG. 6, the figure illustrates a graphical representation of a setup for operation of the apparatus according to another preferred embodiment of the present invention.

Figure 7:
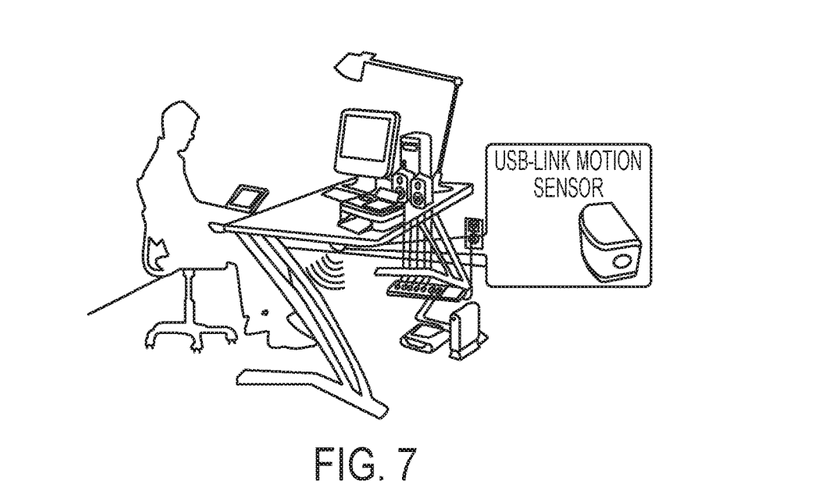
FIG. 7 illustrates a graphical representation of a setup for operation of the apparatus with presence of a user according to a preferred embodiment of the present invention.

As it is shown in FIG. 5, the apparatus according to a preferred embodiment of the present invention is mounted below a monitor of the personal computer (21). This preferred embodiment is further connected to a power strip (31), wherein the power strip (31) comprises a plurality of electrical outlets (32) with the personal computer (21) and other peripheral devices connected to the other electrical outlets. Alternatively, as shown in FIG. 7, the apparatus according to a preferred embodiment of the present invention may be mounted to a portion of desk upon which the personal computer (21) is supported. The apparatus may be mounted using double-sided adhesive tape or any other suitable device for mounting the apparatus to a structure.

The method of operation of the apparatus in the preferred embodiment of the present invention in FIG. 6, comprises the steps of initially detecting presence of a user for a predetermined period, transmitting a control signal to a device connected to the apparatus for powering down the device in an event an absence of the user is detected within the predetermined period, and terminating power supply to at least an electrical outlet of the power strip (31).

The control signal is an artificial signal comprehensible by the device for powering down operation of the device. In other words, the apparatus instructs the personal computer (21) to sleep/off via an artificial keystroke/mimicry of a keyboard connected to the personal computer (21). Ultimately, no software is required to perform this action.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements. For example, it is to be understood that the present invention contemplates that, to the extent possible, one or more features of any embodiment can be combined with one or more features of any other embodiment.

The invention claimed is:

1. A system for controlling electric power supply comprising:
   a device for communicating with a user, the device is energized by electric power being supplied to the device from a main power supply;
   a processor for determining electric power supply to the device, the processor is configured for processing and generating a control signal and transmitting the control signal to the device via a communication protocol; and
   a sensor for monitoring presence of the user, the sensor is configured for transmitting a sensing signal to the processor via an interface,
   wherein, the processor is configured for transmitting the control signal to the device for powering down operation of the device, by receiving and processing the sensing signal from the sensor, in an event the sensor detects that the device is operating in an absence of the user,
   wherein the device is powered down in the absence of the user,
   wherein the control signal is an artificial signal comprehensible by the device for powering down operation of the device, and
   wherein the artificial signal is an artificial keystroke/mimicry of a keyboard connected to the device.

2. The system according to claim 1, wherein the communication protocol is assisted by a universal serial bus connection to the device.

3. The system according to claim 2, wherein the universal serial bus connection is configured for receiving electric power from the device.

4. The system according to claim 1, wherein the sensor is an electronic sensor.

5. The system according to claim 1, wherein the sensor is any one of an infrared sensor or a passive infrared sensor.

6. The system according to claim 1, wherein the device is an electronic device selected from a group of computing devices or electrical equipment configured with high level interface.

7. An apparatus for controlling electric power supply comprising:
   a processor for determining electric power supply to a device, the processor is configured for processing and generating a control signal and transmitting the control signal to the device via a communication protocol; and
   a sensor for monitoring presence of a user, the sensor is configured for transmitting a sensing signal to the processor via an interface,
   wherein, the processor is configured for transmitting the control signal to the device for powering down operation of the device, by receiving and processing the sensing signal from the sensor, in an event the sensor detects that the device is operating in an absence of the user,
   wherein the device is powered down in the absence of the user,
   wherein the control signal is an artificial signal comprehensible by the device for powering down operation of the device, and
   wherein the artificial signal is an artificial keystroke/mimicry of a keyboard connected to the device.

8. The apparatus according to claim 7, wherein the communication protocol is assisted by a universal serial bus connection to the device.

9. The apparatus according to claim 8, wherein the universal serial bus connection is configured for supplying electric power to the device.

10. The apparatus according to claim 7, wherein the sensor is an electronic sensor.

11. The apparatus according to claim 7, wherein the sensor is any one of an infrared sensor or a passive infrared sensor.

12. The apparatus according to claim 7, wherein the device is an electronic device selected from a group of computing devices or electrical equipment configured with high level interface.

13. The apparatus according to claim 7, wherein the apparatus further comprises any one or a combination of a visual indicator, audible indicator, and a switch.

14. The apparatus according to claim 13, wherein the visual indicator is a light emitting diode for indicating operation of the apparatus.

15. The apparatus according to claim 13, wherein the audible indicator is a buzzer for alerting operation of the apparatus.

16. The apparatus according to claim 13, wherein the switch is for controlling operational state of the apparatus.

17. A method of operation of the apparatus of claim 7 comprising the steps of:
   detecting presence of the user for a predetermined period; and
   transmitting the control signal to the device connected to the apparatus for powering down the device in the event the absence of the user is detected within the predetermined period.

18. An apparatus for controlling electric power supply comprising:
   a keyboard configured with a motion sensor for monitoring presence of a user;
   wherein the apparatus is connected to a device and transmits a control signal to the device if no movement of the user is detected for a predetermined period, wherein the device is powered down by the control signal,
wherein the control signal is an artificial signal comprehensible by the device for powering down operation of the device, and
wherein the artificial signal is an artificial keystroke/mimicry of a keyboard connected to the device.

19. The apparatus according to claim 18, wherein the motion sensor is a passive infrared sensor.

20. The apparatus according to claim 18, wherein the device is a personal computer.

21. The apparatus according to claim 18, wherein the control signal comprises any one of sleep, hibernate, or shut down operation.

22. The apparatus according to claim 18, wherein the connection between the keyboard and the device is a wireless connection.

23. The apparatus according to claim 22, wherein the wireless connection is via Bluetooth connection.

24. The apparatus according to claim 18, wherein the connection between the keyboard and the device is a wired connection.

25. The apparatus according to claim 24, wherein the wired connection is via Universal Serial Bus connection.

26. The apparatus according to claim 18, wherein the apparatus further comprises a temperature sensor for providing feedback to a building management system of a temperature status.

27. The apparatus according to claim 18, wherein the keyboard further comprises a light level sensor for providing feedback to a building management system of a light level data.

28. A method of operation of the apparatus of claim 19 comprising the steps of:
detecting movement of the user for a predetermined period; and
instructing the device to sleep, hibernate, or shut down in the event no presence of the user is detected for the predetermined period.

* * * * *

UNITED STATES PATENT AND TRADEMARK OFFICE
CERTIFICATE OF CORRECTION

PATENT NO. : 10,372,192 B2
APPLICATION NO. : 15/357311
DATED : August 6, 2019
INVENTOR(S) : Bernard Christopher Emby It is certified that error appears in the above-identified patent and that said Letters Patent is hereby corrected as shown below:

In the Claims

Column 10, Line 12, Claim 28, delete "claim 19" and insert -- claim 18 --

Signed and Sealed this
Twenty-sixth Day of November, 2019

Andrei Iancu
*Director of the United States Patent and Trademark Office*